US006784422B2

(12) United States Patent
Covey et al.

(10) Patent No.: US 6,784,422 B2
(45) Date of Patent: Aug. 31, 2004

(54) PARALLEL SAMPLE INTRODUCTION ELECTROSPRAY MASS SPECTROMETER WITH ELECTRONIC INDEXING THROUGH MULTIPLE ION ENTRANCE ORIFICES

(75) Inventors: Thomas R. Covey, Richmond Hill (CA); Bruce Thomson, Toronto (CA); Charles L. Jolliffe, Schomberg (CA)

(73) Assignees: MDS Inc., Concord (CA); Applera Corporation, MS (US)

( * ) Notice: Subject to any disclaimer, the term of this patent is extended or adjusted under 35 U.S.C. 154(b) by 191 days.

(21) Appl. No.: 10/148,888

(22) PCT Filed: Dec. 14, 2000

(86) PCT No.: PCT/CA00/01554

§ 371 (c)(1),
(2), (4) Date: Dec. 23, 2002

(87) PCT Pub. No.: WO01/44795

PCT Pub. Date: Jun. 21, 2001

(65) Prior Publication Data

US 2003/0106996 A1 Jun. 12, 2003

Related U.S. Application Data

(60) Provisional application No. 60/170,700, filed on Dec. 15, 1999.

(30) Foreign Application Priority Data

Dec. 15, 1999 (US) .......................................... 60/170700

(51) Int. Cl.[7] ........................... B01D 59/44; H01J 49/00
(52) U.S. Cl. ........................ 250/285; 250/281; 250/288
(58) Field of Search ................................ 250/285, 288, 250/281

(56) References Cited

U.S. PATENT DOCUMENTS 5,668,370 A * 9/1997 Yano et al. ................. 250/288
5,825,026 A * 10/1998 Baykut ....................... 250/288
6,515,279 B1 * 2/2003 Baykut ....................... 250/285

FOREIGN PATENT DOCUMENTS

EP 0966022 12/1999
JP 06215729 8/1994
WO WO 9913492 3/1999
WO WO 99 13492 A * 3/1999

OTHER PUBLICATIONS

Shen, Shida, et al., "Dual Parallel Probes for Electrospray Sources.", Analytica of Branford, Inc., Branford, CT 06405.

Jiang, Longfei, et al., "Development of Multiple–ESI–Sprayers, Multiple Nozzles on a Single Mass Spectrometer and its Application to Accurate Mass Analysis of Organic Compound and Protein Digests", Department of Chemistry and Biochemistry, University of Texas, Austin, TX.

* cited by examiner

*Primary Examiner*—John R. Lee
*Assistant Examiner*—Erin-Michael Gill
(74) *Attorney, Agent, or Firm*—Bereskin & Parr

(57) ABSTRACT

An interface apparatus, for coupling a plurality of ion source to a mass spectrometer has a plurality of ion sources for generating a plurality of ion beams. An inlet device for passing ion beams into the mass spectrometer is provided as is a device or mechanism for selecting one of the ion beams for passage through into the mass spectrometer and for blocking the other ion beams. An outlet provides a connection to a mass spectrometer. A corresponding method is provided.

18 Claims, 3 Drawing Sheets

PARALLEL SAMPLE INTRODUCTION ELECTROSPRAY MASS SPECTROMETER WITH ELECTRONIC INDEXING THROUGH MULTIPLE ION ENTRANCE ORIFICES

This application claims the benefit of provisional application No. 60/170,700 filed Dec. 15, 1999.

FIELD OF THE INVENTION

This invention relates to mass spectrometers. More particularly, this invention relates to ion sources for mass spectrometers, and is concerned with facilitating the handling of multiple sample inputs for mass spectrometers.

BACKGROUND OF THE INVENTION

Most mass spectrometers use a single sample input and there are a very large number of designs and configurations for single input mass spectrometers. However, in the art, there is at least one reference to spectrometer having a parallel array of mass analyzers for the purposes of increasing sample through-put (U.S. Pat. No. 5,206,506, Kirchner). However, this patent does not suggest using several sample inputs to one mass spectrometer; rather, there is a single source of ions from an ion chamber. A plurality of perforated electrode sheets form a number of different paths for ions and also a plurality of potential wells. Thus, all the ions are from the same source.

The applicant is aware of at least one reference to an electrospray mass spectrometer with two ion inlets, each associated with a separate source of ion. Jiang and Moini (Proceedings of the 47th ASMS Conference on Mass Spectrometry and Allied Topics, Dallas, Tex., 1999, pp 2560–2561) showed a system with two electrospray sources, each directed at a separate orifice into the mass spectrometer chamber. This resulted in two ion beams into the mass spectrometer. In the vacuum system, the ion beams were combined before entering the mass spectrometer. The purpose of this method was to use one sprayer to introduce the analyte (the compound to be analyzed) and the second sprayer to simultaneously introduce a mass calibration compound. The calibration compound is then selected to provide one or more distinct peaks, for calibration purposes.

A second type of multiple sample inlet system is described by Bateman et al. in European Patent Application EP 0 966 022 A2. This describes a system in which several sprayers are operated simultaneously, so as to increase the throughout of the mass spectrometer system. A different sample stream is introduced through each sprayer. All sprayers are directed toward a single orifice into the mass spectrometer, and a rotating mechanical blocking device is used to sequentially allow ions from each sample stream to be sampled into the mass spectrometer through a single orifice. The sprayers are indexed to the blocking device in order to correlate the mass spectral information with the particular sprayer.

A third system of multiple sprayers is disclosed in an abstract entitled "Dual Parallel Probes for Electrospray Source" from the Proceedings of the American Society for Mass Spectrometry, Dallas Tex., June, 1999, pp 458–459, by Shida Shen, Bruce A. Andrien Jr., Michael Sansone and Craig Whitehouse. However, this reference also does not index the sprayer to the data system in the sense of the present invention. Thus, Shen et al use a single orifice into the mass spectrometer, and produce spectra that are mixed. The practical use of this system is to introduce a known calibrant ion for use as a reference mass, to mass calibrate the ions being produced from the sample being analyzed with the other sprayer. Another potential use of this crude dual sprayer approach is when one is doing targeted analysis such as quantitation. If the following two conditions are met some practical use can be achieved: (1) the analyte mass is known and is specifically monitored by the mass spectrometer, and (2) the masses being monitored are different from the individual sprayers. This is technically a type of indexing, but is not useful in the case where composition of the sample is unknown, because then you do not know which ions are from which sample.

SUMMARY OF THE PRESENT INVENTION

The basic idea of the present invention is a method of simultaneously introducing multiple samples into an electrospray mass spectrometer for purposes of increasing the productivity of the instrument. There are potentially several ways of doing this, all of which provide some means of indexing the incoming samples with the signal produced in the mass spectrometer. A key concept is "indexing", i.e. at any point in time the data system of the mass spectrometer of the present invention is able to associate a particular mass spectrum with a particular sprayer (or to put it another way. with a particular sample).

For example, if one were to simply mount an array of sprayers all simultaneously introducing different samples into the mass spectrometer with no way of knowing which mass spectrum came from which sprayer (or to put it another way, which mass spectrum was associated with which sample injected) the data would be useless. So in essence, the present invention sequentially allows the signal from one sprayer at a time to pass to the detector of the mass spectrometer thereby unequivocally associating a particular mass spectrum with a particular sprayer sample. Samples are injected at the same point in time into different flowing streams running in a parallel fashion into the mass spectrometer and the signal from each source is rapidly and sequentially turned on and off quickly to obtain spectra from each stream as the sample plugs pass through.

One method of doing this is to utilize a single electrospray nebulizer and, by utilizing a multiport valve, sequentially divert the desired sample into the electropsray nebulizer. This method suffers from the time delay incurred from such valves and the time required for spray stabilization during each divert period. All of these contribute to excessive duty cycle losses. In addition, there may be a memory effect whereby trace amounts of one sample remain in the tubing or sprayer, and interfere with the next sample; this again would increase duty cycle losses.

A second method is to have an array of electrospray nebulizers all introducing liquid samples into the mass spectrometer ion source simultaneously. Each nebulizer is sequentially turned on and off by cycling the high voltage to the sprayer required to give charge separation in the liquid necessary for ion production. This method suffers from the time delay incurred from the turning on and off of the high voltage power supplies and stabilization of such high voltages (kilovolt range). There is also a time delay for spray stabilization during each on/off high voltage period. All of these contribute to excessive duty cycle losses.

A third method is to have an array of electrospray nebulizers all introducing liquid samples into the mass spectrometer ion source simultaneously with the high voltage on, for all sprayers at all times. All sprayers are aimed at a single ion entrance aperture into the vacuum system. The charged droplets emitted from the sprayers are deflected by means of a mechanical blocking device. All sprayers are mechanically blocked with the exception of the one from which signal is desired at that point in time. The mechanical blocking device is situated between the sprayers and the inlet orifice of the vacuum system of the mass spectrometer; thus it is located in the atmospheric region of the mass spectrometer. This method suffers from the time delay incurred from the mechanical positioning of the blocking device resulting in a duty cycle loss and from limitations in the liquid flows that can be introduced through the sprayers. Excessive liquid impacting on a rotating mechanical shutter will result in excessive background interferences.

A fourth method of the present invention is to divert or focus the ion beam from a given sample after it has entered the first chamber of the mass spectrometer. In this case an array of sprayers is situated around an array of ion entrance apertures which in him are situated around a single mass analyzer. All sprayers simultaneously introduce the samples from their respective sources and the high voltage is on for all the sprayers, so that they are all producing ions and are never destabilized. The ions from the respective sprayers all pass through their associated ion entrance aperture into the first chamber of the mass spectrometer, which may be at atmospheric pressure or may be in the vacuum chamber. Once inside the first chamber the ions can be easily deflected either away from the mass spectrometer or focused onto the path for mass analysis and detection. Low voltages are all that is necessary to accomplish this task (less then kilovolt range) thus allowing very high speed switching and minimum duty cycle loss. Sprayer stabilization is not an issue because, using this method, sprayers are always on. Since no rotating mechanical devices are employed to divert the liquid sprays excessive background interferences from overloading sprays will not occur.

In accordance with a first aspect of the present invention, there is provided an interface apparatus, for coupling a plurality of ion sources to a mass spectrometer, the apparatus comprising:

a plurality of ion sources for generating a plurality of ion beams;

inlet means for passing the ion beams into the mass spectrometer;

selection means for selecting one of the ion beams for passage through into the mass spectrometer and for blocking the other ion beams; and an outlet for connection to a mass spectrometer.

Preferably, the inlet means comprises a wall including a plurality of apertures, wherein each ion source is associated with and located adjacent a respective aperture, for passage of ions through the respective aperture.

More preferably, the interface apparatus includes a plurality of electrodes within the apparatus, with each electrode associated with a respective ion source, whereby voltages can be applied to the electrodes to permit passage of ions from one ion source through to the outlet for connection to the mass spectrometer and to prevent the passage of ions from the other ion sources. The electrodes can be mounted externally.

The interface apparatus conveniently includes a mechanism for enabling a selected one of the apertures to be open and to close off all the other apertures, whereby one of the ion beams can be selected for a passage through to the outlet.

The mechanism preferably comprises a moveable element, including at least one second aperture, which is moveable whereby said second aperture can be brought into alignment with a selected one of the first apertures.

The interface apparatus can include an outer wall, defining a chamber for curtain gas between the first wall and the exterior, the outer wall including a plurality of further apertures.

The apparatus can also include an interior wall and an intermediate chamber defined between the first wall and the interior wall, and the interior wall can include a skimmer including another aperture permitting passage of selected ions through to the mass spectrometer, and the intermediate chamber including a port for connection to a pump.

Each of the ion sources conveniently comprises an electrospray source.

Advantageously, the interface includes a plurality of baffles separating the ion sources.

Another aspect of the present invention provides a method of analyzing a plurality of samples, the method comprising the steps of:

(1) passing the plurality of samples through a plurality of ion sources, to generate a plurality of ion beams;

(2) passing the ion beams through an inlet means, having an outlet for connection to a mass spectrometer;

(3) selecting one ion beam for passage through to the outlet;

(4) within the inlet means, permitting passage of said one selected ion beam through to the outlet, and blocking passage of the other ion beams.

The method preferably includes selecting each ion beam in turn for a predetermined period, to provide a complete cycle through all the ion beams, and continuously cycling through the sample streams from the ion beams.

The method advantageously includes:

(a) passing the ion beams through apertures in a first wall;

(b) providing electrodes for controlling the ion beams, with there being one aperture in the first wall and one electrode for each ion beam;

(c) providing a potential to one electrode to permit passage of one ion beam through to the outlet, and providing potentials to the other electrodes to prevent passage of the other ion beams through to the outlet.

The method can include providing the electrodes in an intermediate chamber and maintaining the intermediate chamber at a pressure intermediate atmospheric pressure and a low pressure within a mass spectrometer, and passing the ion beam through a skimmer from the intermediate chamber to the outlet.

Preferably, the method additionally includes passing the ion beams through a curtain gas chamber into the intermediate chamber.

BRIEF DESCRIPTION OF THE DRAWING FIGURES

For a better understanding of the present invention and to show more clearly how it may be carried into effect, reference will now be made, by way of example, to the accompanying drawings in which.

DETAILED DESCRIPTION OF THE PREFERRED EMBODIMENTS

As above, the basic principle of the present invention is to have two or more electrospray ion sources operating simultaneously, with different samples introduced through each sprayer, and the sprayers configured so that the samples are kept separate from one another on the atmospheric side. The plume of each spray is sampled by a separate aperture, allowing ions from each sprayer into the vacuum chamber. Using lenses either inside or outside the vacuum chamber, the ion beam is directed in such a way that only the beam from one sprayer enters the mass spectrometer at any one time. The ion lenses are controlled in such a way that each ion beam is sequentially sampled into the mass spectrometer a short period of time. Thus, by simply cycling trough each of the ion beams, all samples can be analyzed in parallel. Typical cycle times could be one second for example, so if four samples were being analyzed (using four sprayers and four apertures), each one would be sampled for 250 ms.

Figure 2:
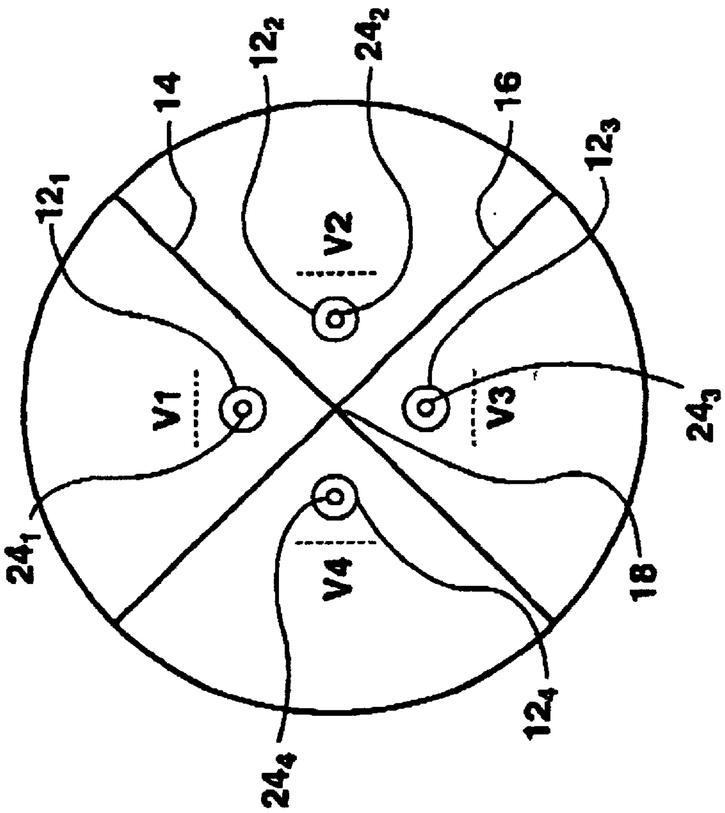
FIG. 2 shows a schematic, cross-sectional view perpendicular to the axis of the first embodiment of the apparatus.
Figure 1:
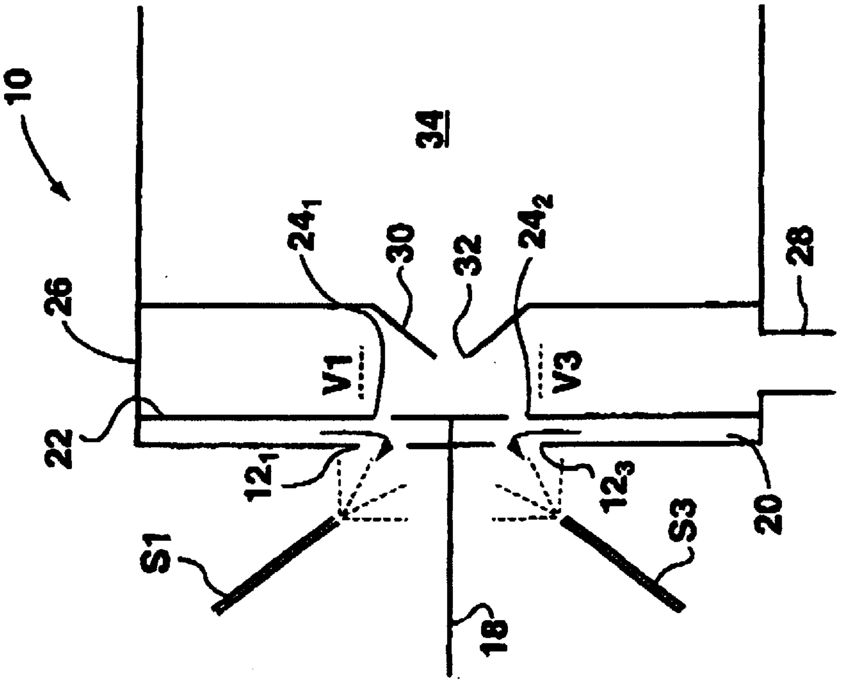
FIG. 1 shows a schematic, sectional view including the axis of a first embodiment of an apparatus in accordance with the present invention.

Referring first to FIG. 1, a first embodiment of an apparatus in accordance with the present invention is indicated by the reference 10. The apparatus 10 includes four sprayers arranged in a square and directed as shown in FIG. 1, with only sprayers $S^1$, $S^3$ being visible in FIG. 1, and with the other two sprayers occupying the other, diagonally opposite pair of corners of the square. Each sprayer is located adjacent a respective aperture 12, the individual apertures being identified as $\mathbf{12}^1$, $\mathbf{12}^2$, $\mathbf{12}^3$ and $\mathbf{12}^4$ for the four separate sprayers. FIG. 2 shows the arrangement of the apertures $\mathbf{12}^1$–$\mathbf{12}^4$.

To separate the sprayers and prevent cross-contamination or mixing between the separate display of plumes, to baffles 14, 16 are provided, which intersect perpendicularly and meet along the axis indicated at 18 in FIG. 2; this intersection 18 of the baffles is also indicated in FIG. 1.

Referring back to FIG. 1, a chamber 20 is supplied with a curtain gas, in known manner. This curtain gas then flows out through the apertures $\mathbf{12}^1$–$\mathbf{12}^4$ as indicated by the arrows, to prevent solvent vapour and the like passing into the spectrometer.

A wall 22 separates the chamber 20 from an intermediate pressure chamber 26. In the wall 22, there are four apertures $\mathbf{24}^1$, $\mathbf{24}^2$, $\mathbf{24}^3$, and $\mathbf{24}^4$, each aligned with a respective one of the apertures $\mathbf{12}^1$, $\mathbf{12}^2$, $\mathbf{12}^3$ and $\mathbf{12}^4$ and associated with a respective sprayer.

Within the intermediate pressure chamber 26, there are four electrodes, indicated at $V^1$, $V^2$, $V^3$ and $V^4$, again associated with a respective one of the sprayers $S^1$, $S^2$, $S^3$ and $S^4$. In known manner, a further wall 30 including a skimmer cone 32 defining an aperture, separates the intermediate frame from a first chamber 34 of the mass spectrometer. In known manner, a quadrupole rod set or the like could be located in the chamber 34, to receive ions passing through the skimmer cone 32, to collect and to focus those ions The apertures 12 are typically 3 mm in diameter and the apertures 24 are typically 0.2 nm in diameter. The skimmer cone 32 is typically 2 mm in diameter.

The pressure in chamber 36 is typically 1 torr, and in chamber 34, typically $10^{-2}$ torr (ie 10 mtorr).

The chamber 34 would typically have a collisionally-cooling quadrupole or ion lenses to focus the ions into a further chamber which would contain the mass analyzer.

As shown, the intermediate pressure chamber 26 has a connection 28 to a pump, for maintaining a desired low pressure therein, and in known manner, appropriate pump connections would be provided for the chamber 34.

Additionally, the electrodes $V^1$, $V^2$, $V^3$ and $V^4$ are connected to a control unit (not shown), for applying DC voltages to these electrodes for controlling ion flow as detailed below.

In use, voltages are applied to the electrodes $V^1$, $V^2$, $V^3$ and $V^4$, so that ions from one of the sprayers are permitted or promoted to pass through the cone 32, while ions from the other three sprayers are deflected away from the cone 32. Thus, a voltage of +50V can be applied to the electrode $V^1$, to deflect positive ions passing through aperture $\mathbf{24}^1$ towards the aperture in the cone 32. This will serve to focus the ions towards the cone 32, bearing in mind that the lower pressure in chamber 34 will show a strong and constant gas flow through into the chamber 34.

At the same time, a voltage of −50V is applied to the electrodes $V^2$, $V^3$ and $V^4$, drawing ions away from the aperture in the cone 32. This ensures that only ions from sprayer $S^1$ pass through into chamber 34, while ions from the other three sprayers do not reach the skimmer or cone 32.

These voltages can be maintained for a set period, and then switched to cause ions from the next sprayer to pass through to the chamber 34. For example, the voltages could be held for 250 ms, and then switched so that the electrode $V^2$, has the positive voltage with the other electrodes having the negative voltage, causing ions from the second sprayers to be focused through to the chamber 34. This could be repeated every 250 ms, to cycle through the four sprayers $S^1$, $S^2$, $S^3$ and $S^4$. This cycle is kept up continuously, or as long as the samples last. This enables four samples to be analyzed in a quasi-parallel fashion.

It will be appreciated that, during the time that each of the ion beams is deflected away from the skimmer or cone 32, the sample is lost and no information is obtained from that sample. Therefore, the total cycle time must be consistent with the fastest events (e.g. chromatographic peak widths) in each sample. Typically, one spectrum per second from each sample will be sufficient, so that the total cycle time should be about 1 second.

It could also be noted that there is no requirement for the samples, from the four sprayers, to be related in any way. The mass spectrometer can be used to monitor different m/z values of each sample (MI (multiple ion) or MRM (multiple reaction mode)) or to record full mass spectra for each sample.

In a configuration of FIGS. 1 and 2, it will be appreciated that there are some sizing issues that would need to be addressed. Thus, with full sprayers and associated apertures all connected through, all the time, through to the chamber 26, the pumping requirements for chamber 26 could be significant. Thus, it may be necessary to size the apertures $\mathbf{12}^1$–$\mathbf{12}^4$ and $\mathbf{24}^1$–$\mathbf{24}^4$ to be smaller than corresponding apertures in single sprayer instruments, in order to maintain pumping requirements reasonable.

Another approach is to allow ions and gas through only one aperture at a time, rather than just deflect the ion beam. This would allow each aperture to be as large as that in a standard single-aperture mass spectrometer, without increasing the size of the vacuum pumps. Thus each orifice would be sequentially opened for a brief period (e.g. 250 ms in the example cited above), and then close while the next orifice was opened. Simultaneously, the appropriate ion lens or electrode would be used to deflect the ion beam into the mass spectrometer. Such "pulsed aperture" devices are used in forming pulsed molecular beams. In molecular beam instruments, a neutral gas pulse is admitted to the vacuum chamber by opening a needle valve briefly. The gas pulse is ionized in the vacuum chamber. The same principle could be used to admit the ion beam, although passing ions through a needle valve may not be as easy as passing a neutral gas, at least the principle is established. For example, a solenoid can be used to briefly open a valve, admitting the ions and gas from one sprayer, while the others are dosed. Alternatively, a small aperture can be rapidly opened or dosed by applying a brief voltage pulse to two plates which move apart (forming a small channel) when the voltage is applied, and together (losing the orifice) when the voltage is turned off.

This principle of opening and closing the apertures allows each sample to be sensitively analyzed through a large aperture.

Another method of accomplishing switching between ion beams is to use one large aperture, and control the ion beams outside of the vacuum chamber, so that the beam from each sprayer is diverted toward the orifice one after another. For example, four sprayers may be operated in parallel so that the plumes from all four sprays are separated in space (e.g. by baffles and somewhat shown for FIGS. 1 and 2). The sprays are arranged around a central region which contain four apertures leading to a second chamber. Then the ion beams can be individually gated through the respective apertures into the first chamber, where the ions are then drawn into the mass spectrometer. Only one ion plume is sampled at a time, allowing each sample to be sampled in sequence, without interference from the other. A configuration which allows and excludes external gating is shown in FIG. 3.

Figure 3:
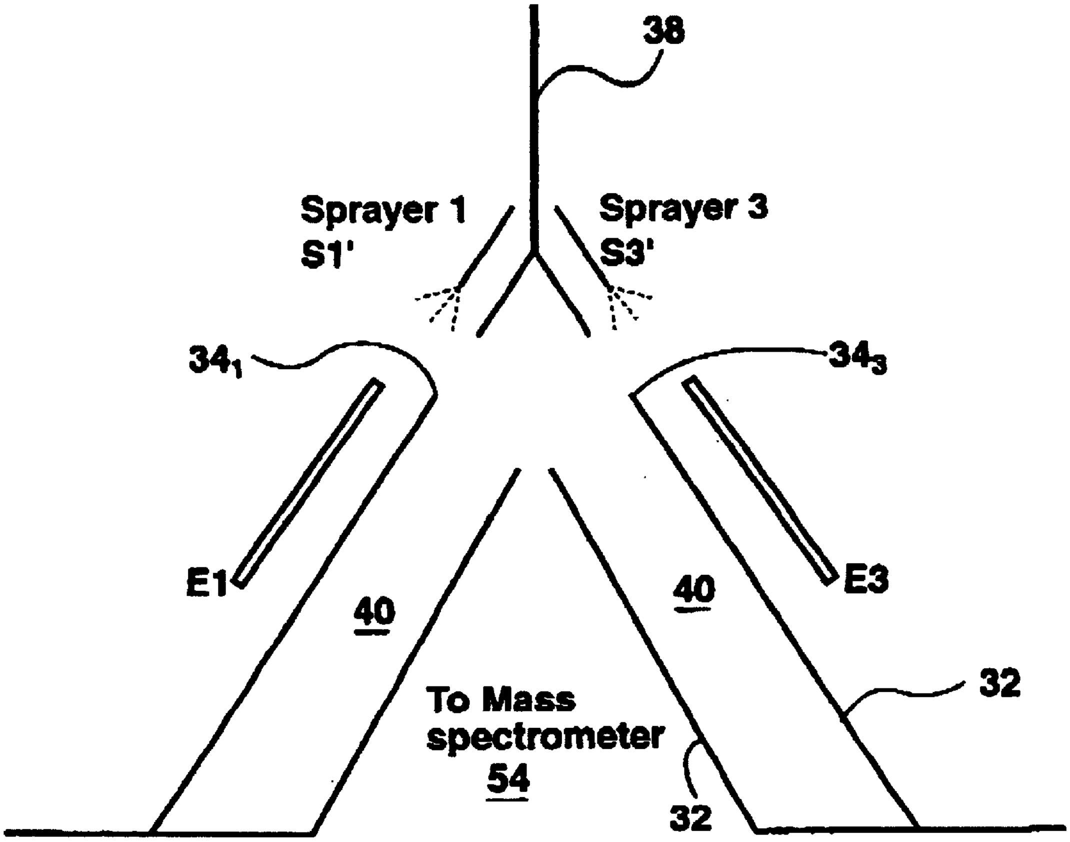
FIG. 3 shows a schematic cross-sectional view including the axis of a second embodiment of an apparatus in accordance with the present invention.

Referring to FIG. 3, a second embodiment of the invention is identified by the reference 30. Four sprayers, S1, S2, S3 and S4 are disposed around cone 32. Baffles (not shown) would be similar to baffles 14, 16 of FIGS. 1 and 2. As for baffle intersection 18 in FIG. 1, a baffle intersection 38 is shown in FIG. 3. A first chamber 40 leads to the orifice 52 in a skimmer cone 50. A separate aperture $\mathbf{34}^1$, $\mathbf{34}^2$, $\mathbf{32}^3$, $\mathbf{34}^4$, opens into the first chamber next to each sprayer S1', S2', S3', S4'. Electrodes E1 to E4 are located adjacent the sprayers S1', S2', S3', S4' respectively, and direct each ion beam into the appropriate aperture, into chamber 40; from chamber 40, the vacuum draws ions into the main chamber 54 of the mass spectrometer.

In use, operation of the second embodiment of FIG. 3 is similar to the first embodiment. Thus, voltages would be supplied to three of electrodes E1 to E3, to block ions from passing through the respective apertures $\mathbf{34}^1$ to $\mathbf{34}^4$. For example, for positive ions, these three electrodes could be set at −50V, to attract ions to pass over the respective one of the apertures $\mathbf{34}^1$ to $\mathbf{34}^4$. The fourth electrode would then be set to a positive voltage. There is an outflow of gas out of chamber 40, this being curtain gas, as for the earlier embodiment. The electrodes are biased so that when negative, ions do not enter chamber 40, they go to the respective electrode. For the electrode that is positive, the ions are pushed into chamber 40 toward the skimmer orifice. The vacuum then draws the ions through the aperture in the skimmer cone 32, to the chamber 54.

As for the first embodiment, the electrodes E1 to E4 can be cycled, with an appropriate timing sequence, so that ions from each sprayer S1' to S4' are sequentially passed through to the mass spectrometer in chamber 54.

The description of the two embodiment above has, implicitly, assumed that positive ions would be generated by the sprayer. It will be understood that, when negative ions are present, then voltages on the electrodes E1 to E4 would simply need to be reversed. Alternatively, the apertures can be blocked and unblocked by using suitable mechanism which ensures that the apertures do not rotate from one region to the other. This prevents contamination of one sample stream by the other.

Figure 4:
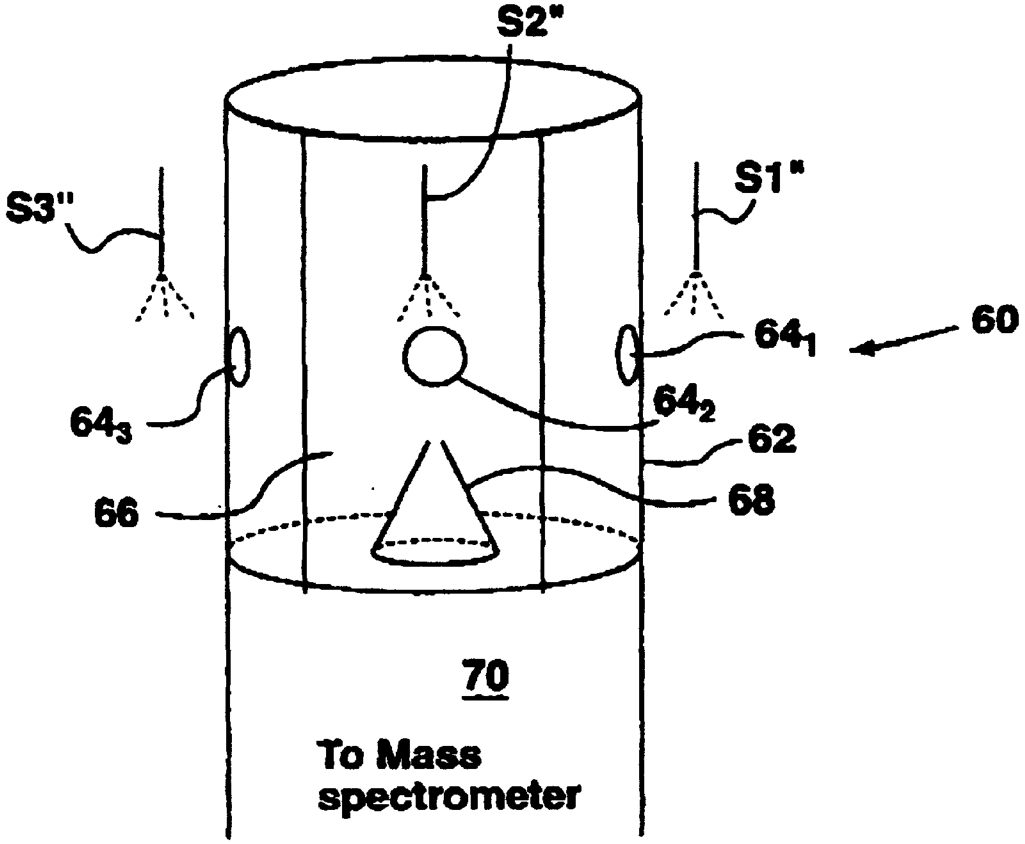
FIG. 4 shows a schematic, perspective view of a third embodiment of an apparatus in accordance with the present invention.

A further example of this configuration is shown in FIG. 4. Four sprayers S1", S2", S3", S4" are disposed about a cylindrical chamber 62 and the sprayers are at atmospheric pressure. Apertures $\mathbf{64}^1$, $\mathbf{64}^2$, $\mathbf{64}^3$, $\mathbf{64}^4$ are provided for the sprayers and lead into cylindrical chamber 66. A skimmer cone 68 contains an orifice leading to a chamber 70 of the mass spectrometer. Each aperture $\mathbf{64}^1$ to $\mathbf{64}^4$ can be blocked or unblocked by a mechanical shutter (not shown) which is controlled from the computer. Then the sample from each sprayer can be sampled separately by opening the shutter and closing the others.

Another way of achieving this is to use another second cylinder inside the first cylinder or housing 62. The second cylinder has four apertures in it located in such a position that when one aperture is open, the others are blocked. The cylinder is not rotated so far as to carry sample from one region into another sprayer region, e.g. in a port or aperture of the cylinder. Also, the second cylinder could simply include one aperture and be rotated 90° at a time to align that aperture with a respective one of the apertures $\mathbf{64}^1$ to $\mathbf{64}^4$.

It is recognized that sequentially sampled multiple sprayers results in duty cycle for each of 1/N, where N is the number of sprayers. For example, if four sprayers/apertures are used, each one is sampled for only 25% of the time. Even with a large orifice, this results in loss of signal-to-noise for each sprayer. Ideally, a form of trapping should be used in order to store the ions from each beam when that beam is not entering the mass spectrometer, and then rapidly dump the stored ions into the mass spectrometer when that beam is to be sampled. A device known as FAIMS, described by Guevremont et al (47th ASMS Conference on Mass Spectrometry and Allied Topics, Dallas, Tex., 1999) has been shown to be able to trap ions at atmospheric pressure for periods of a fraction of a second, and this device could be employed to momentarily trap and then release the ions in synchronization with the mass spectrometer. This method would eliminate the duty cycle losses associated with any of the methods described above.

What is claimed is:

1. An interface apparatus, for coupling a plurality of ion sources to a mass spectrometer, the apparatus comprising:

a plurality of ion sources for generating a plurality of ion beams;

inlet means for passing the ion beams into the mass spectrometer;

selection means for selecting one of the ion beams for passage through into the mass spectrometer and for blocking the other ion beams; and an outlet for connection to a mass spectrometer.

2. An interface apparatus as claimed in claim 1, wherein the inlet means comprises a wall including a plurality of apertures, wherein each ion source is associated with and located adjacent a respective aperture, for passage of ions through the respective aperture.

3. An interface apparatus as claimed in claim 2, which includes a plurality of electrodes within the apparatus, with each electrode associated with a respective ion source, whereby voltages can be applied to the electrodes to permit passage of ions from one ion source through to the outlet for connection to the mass spectrometer and to prevent the passage of ions from the other ion sources.

4. An interface apparatus as claimed in claim 2, which includes a plurality of electrodes mounted externally.

5. An interface apparatus as claimed in claim 2, which includes a mechanism for enabling a selected one of the apertures to be open and to close off all the other apertures, whereby one of the ion beams can be selected for a passage trough to the outlet.

6. An interface apparatus as claimed in claim 5, wherein the mechanism comprises a moveable element, including at least one second aperture, which is moveable whereby said second aperture can be brought into alignment with a selected one of the first apertures.

7. An interface apparatus as claimed in claim 2, which includes an outer wall, defining a chamber for curtain gas between the first wall and the exterior, the outer wall including a plurality of further apertures.

8. An apparatus as claimed in any one of claims 3 to 7, which includes an interior wall and an intermediate chamber defined between the first wall and the interior wall, and wherein the interior wall includes a skimmer including another aperture permitting passage of selected ions through to the mass spectrometer and the intermediate chamber including a port for connection to a pump.

9. An interface apparatus as claimed in any one of claims 3 to 7, wherein each of the ion sources comprises an electrospray source.

10. An interface apparatus as claimed in claim 1, which includes a plurality of baffles separating the ion sources.

11. A method of analyzing a plurality of samples, the method comprising the steps of:

(1) passing the plurality of samples through a plurality of ion sources, to generate a plurality of ion beams;

(2) passing the ion beams through an inlet means, having an outlet for connection to a mass spectrometer;

(3) selecting one ion beam for passage through to the outlet;

(4) within the inlet means, permitting passage of said one selected ion beam through to the outlet, and blocking passage of the other ion beams.

12. A method as claimed in claim 11, which includes selecting each ion beam in turn for a predetermined period, to provide a complete cycle through all the ion beams, and continuously cycling through the sample streams from the ion beams.

13. A method as claimed in claim 11, which includes:

(a) passing the ion beams through apertures in a first wall;

(b) providing electrodes for controlling the ion beams, with there being one aperture in the first wall and one electrode for each ion beam;

(c) providing a potential to one electrode to permit passage of one ion beam through to the outlet, and providing potentials to the other electrodes to prevent passage of the other ion beams through to the outlet.

14. A method as claimed in claim 13 which includes providing the electrodes in an intermediate chamber and maintaining the intermediate chamber at a pressure intermediate atmospheric pressure and a low pressure within a mass spectrometer, and passing the ion beam through a skimmer from the intermediate chamber to the outlet.

15. A method as claimed in claim 14, which additionally includes passing the ion beams through a curtain gas chamber into the intermediate chamber.

16. A method as claimed in claim 13, which includes providing electrodes on the exterior, and passing the ions through an intermediate chamber into the mass spectrometer.

17. A method as claimed in claim 13, which includes providing a mechanical member having at least one aperture therein, and displacing the mechanical member to align said aperture with one of the first apertures, to permit passage ions therethrough and simultaneously to block off all other first apertures.

18. A method as claimed in claim 17, which includes providing the first apertures in a cylindrical wall, and providing the mechanical member as a cylindrical member coaxial with the cylindrical wall and rotatable relative thereto, and which includes providing the first apertures in a circle around the cylindrical wall and providing the cylindrical member with one aperture alignable with one of the first apertures.

* * * * *